Figure 5:
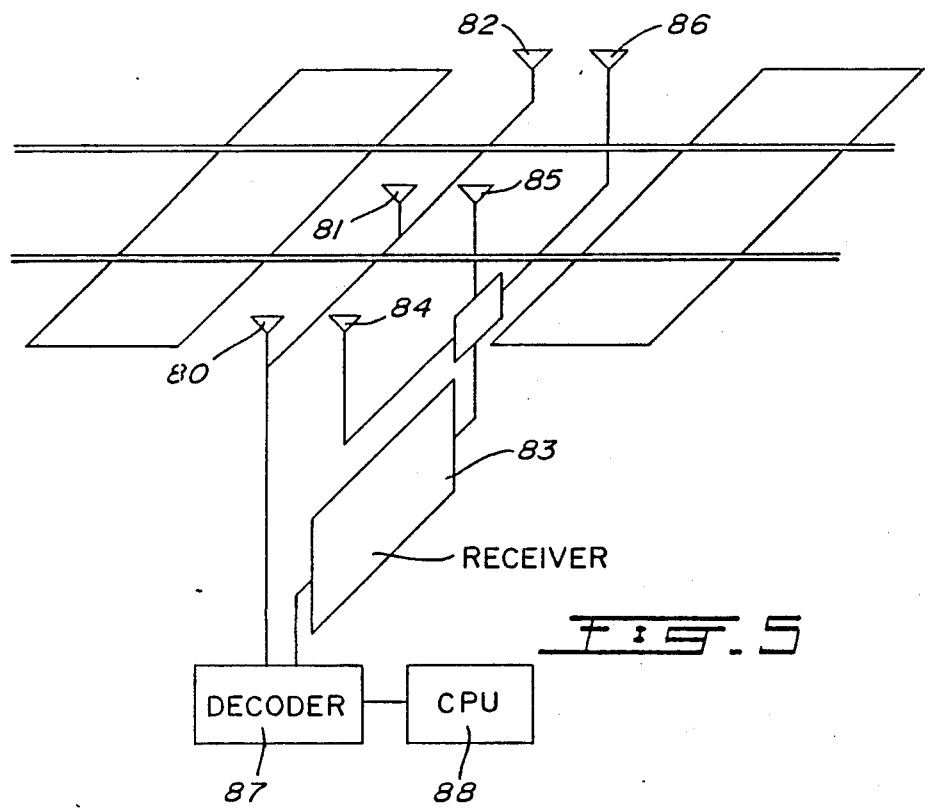

United States Patent [19]

Baldwin et al.

[11] Patent Number: 4,937,581

[45] Date of Patent: * Jun. 26, 1990

[54] ELECTRONIC IDENTIFICATION SYSTEM

[75] Inventors: Howard A Baldwin, Lakeside, Ariz.; Conrad M. B. Walker; William K. Brockelsby, both of Edmonton, Canada

[73] Assignee: EID Electronic Identification Systems Ltd., Montreal, Canada

[ * ] Notice: The portion of the term of this patent subsequent to Sep. 26, 2006 has been disclaimed.

[21] Appl. No.: 383,169

[22] Filed: Jul. 20, 1989

Related U.S. Application Data

[63] Continuation of Ser. No. 195,400, May 13, 1988, Pat. No. 4,870,419, which is a continuation of Ser. No. 661,712, Oct. 17, 1984, abandoned, which is a continuation-in-part of Ser. No. 536,010, Sep. 26, 1983, abandoned, which is a continuation of Ser. No. 234,570, Feb. 13, 1981, abandoned.

[30] Foreign Application Priority Data

Feb. 13, 1980 [GB] United Kingdom ................. 8004851

[51] Int. Cl.$^5$ ............................................. G01S 13/74
[52] U.S. Cl. ......................................... 342/44; 342/45; 342/50; 342/51; 235/384; 340/825.54; 340/825.83
[58] Field of Search ............... 340/505, 825.54, 825.72, 340/825.83, 825.86, 905, 941–943; 235/384, 385

[56] References Cited

U.S. PATENT DOCUMENTS

| | | | |
|---|---|---|---|
| 3,163,860 | 12/1964 | Bailey | 342/44 |
| 3,290,675 | 12/1966 | Neild | 340/825.34 |
| 3,346,842 | 10/1967 | Dixon | 340/933 |
| 3,359,554 | 12/1967 | Hoffmann-Heyden | 342/50 |
| 3,713,148 | 1/1973 | Cardullo et al. | 342/42 |
| 3,750,163 | 7/1973 | Hecker | 342/45 |
| 3,772,668 | 11/1973 | Smith | 340/825.54 |
| 3,798,641 | 3/1974 | Preti | 342/44 |
| 3,813,658 | 5/1974 | Rich, Jr. | 235/449 |
| 3,813,659 | 5/1974 | Charlton | 235/449 |
| 3,816,708 | 6/1974 | Walton | 340/825.3 |
| 3,839,717 | 10/1974 | Paul | 342/44 |
| 3,918,057 | 11/1975 | Van Tol | 342/51 |
| 3,935,432 | 1/1976 | Maynard | 235/465 |
| 3,984,835 | 10/1976 | Kaplan | 342/44 |
| 4,002,889 | 1/1977 | Hoyer-Ellefsen | 235/487 |
| 4,015,259 | 3/1977 | Siverhus et al. | 342/44 |
| 4,068,211 | 1/1978 | Van Tol | 340/933 |
| 4,068,232 | 1/1978 | Meyers et al. | 342/44 |
| 4,075,632 | 2/1978 | Baldwin et al. | 342/51 |
| 4,104,630 | 8/1978 | Chasek | 342/44 |
| 4,114,151 | 9/1978 | Denne et al. | 342/44 |
| 4,167,007 | 9/1979 | McGeoch et al. | 342/44 |
| 4,180,815 | 12/1979 | Hill | 342/43 |
| 4,209,783 | 6/1989 | Ohyama et al. | 340/825 |
| 4,303,904 | 12/1981 | Chasek | 235/384 |
| 4,631,708 | 12/1986 | Wood et al. | 342/42 X |
| 4,807,140 | 2/1989 | Saulnier et al. | 340/825.54 X |

FOREIGN PATENT DOCUMENTS 59-27278 2/1984 Japan .

OTHER PUBLICATIONS

"Handbook of Microprocessors, Microcomputers, and Minicomputers", John D. Lenk, Prentice-Hall, Inc., 1979, pp. 51, 52 and 280.

Primary Examiner—Thomas H. Tarcza
Assistant Examiner—Bernarr Earl Gregory
Attorney, Agent, or Firm—Fitch, Even, Tabin & Flannery

[57] ABSTRACT

An identification system to identify objects from a remote interrogation station may be used with moving objects such as railroad cars. The system remotely programs and stores information on an object and remotely retrieves information from the object. An information and identity storage device is located on the object and at least one interrogation station is located remotely from the object.

1 Claim, 3 Drawing Sheets

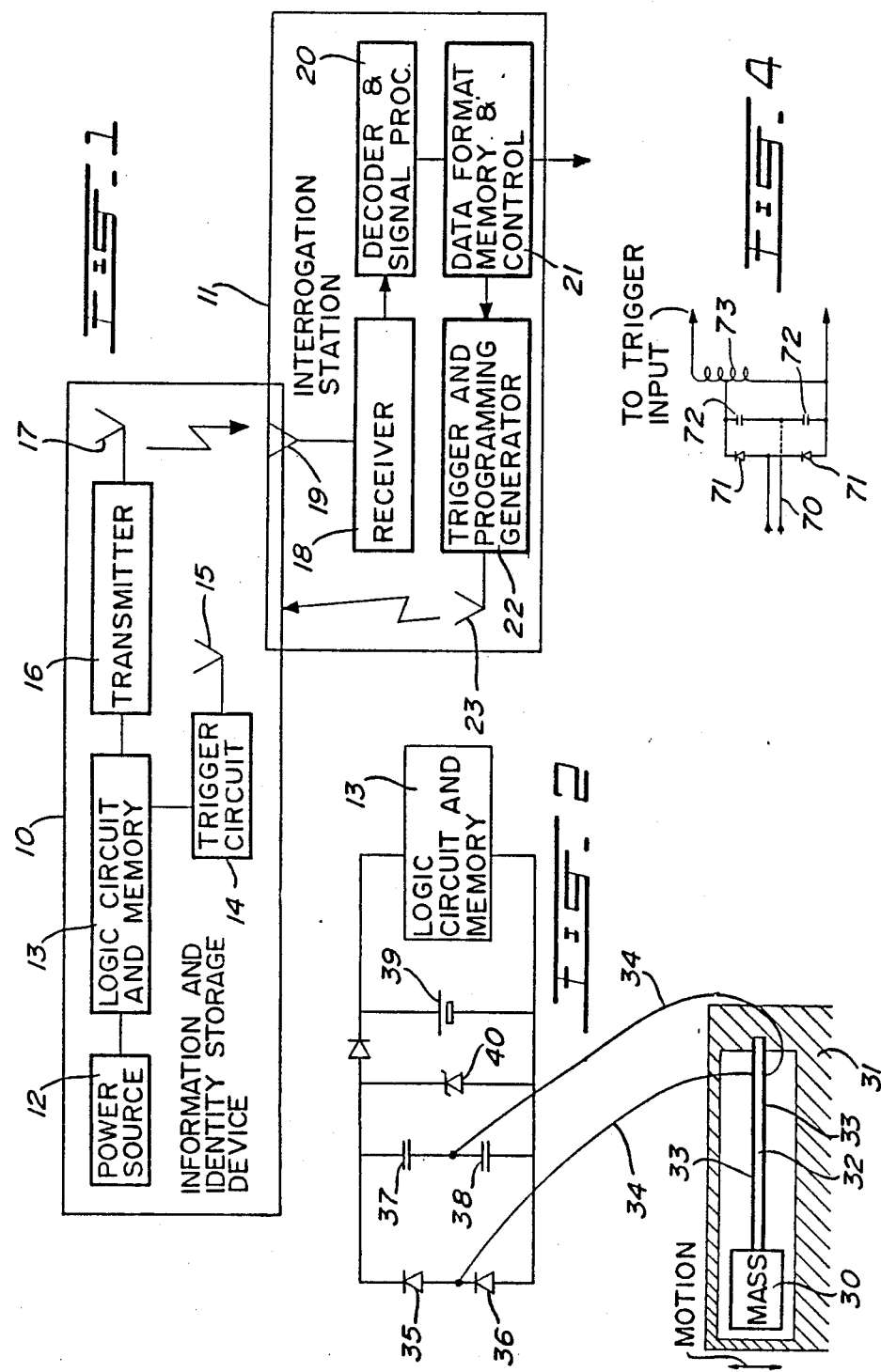

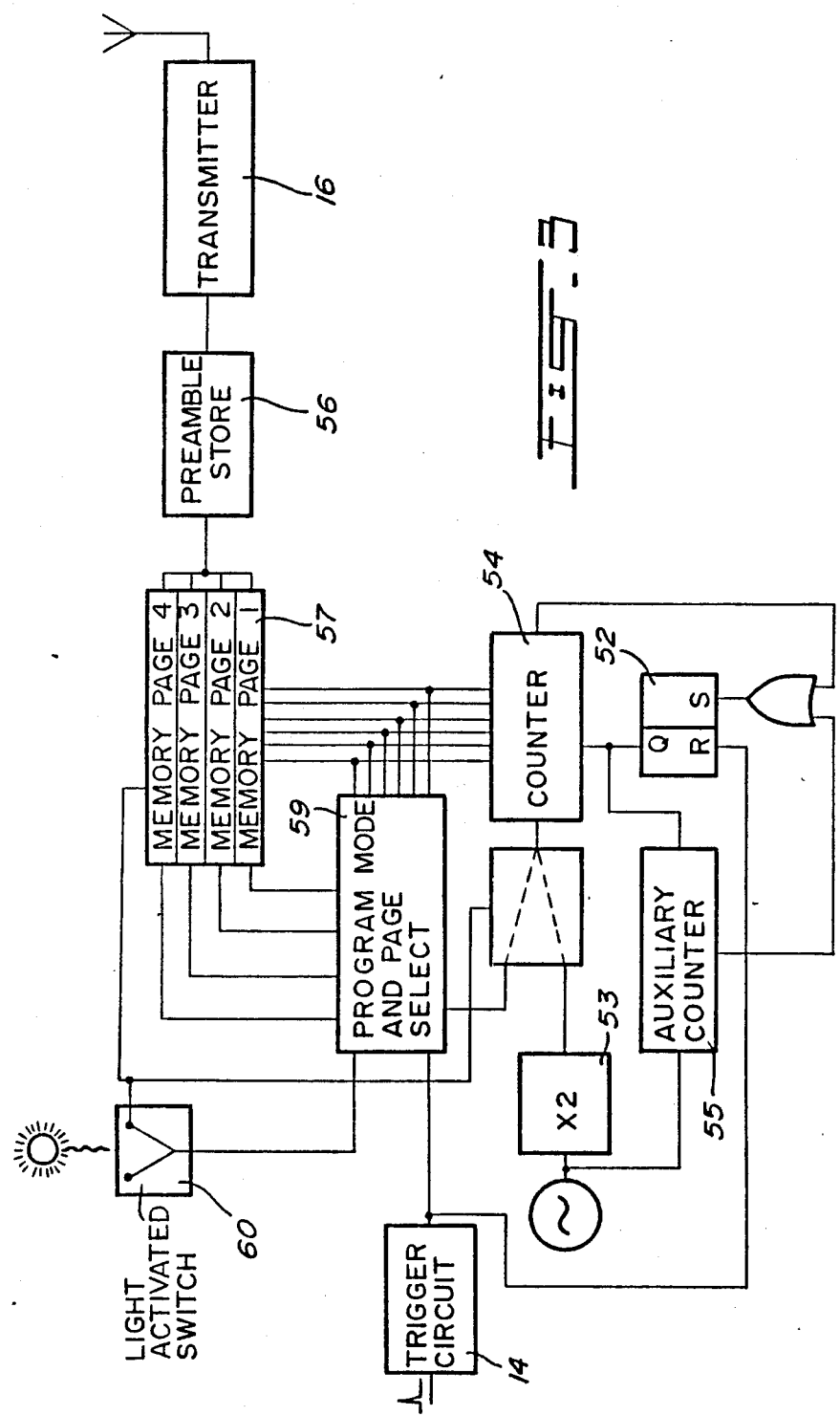

DATA RECEIVER DETAIL

ELECTRONIC IDENTIFICATION SYSTEM

This is a continuation, of application Ser. No. 195,400, filed May 13, 1988, now U.S. Pat. No. 4,870,419, which is a continuation under 37 C.F.R 1.62 of application Ser. No. 661,712, filed Oct. 17, 1984, now abandoned, which is a continuation-in-part of Ser. No. 536,010 filed on Sept. 26, 1983, now abandoned, which is a continuation of Ser. No. 234,570, now abandoned, filed on Feb. 13, 1981.

The invention relates to an identification system suitable for identifying objects from a remote interrogation station. More specifically, the invention provides an electronic identification device including logic circuit and memory, trigger circuit and a transmitter positioned on an object and a remote interrogation station including a receiver and data processor, together with a means for remotely programming the electronic identification device with transient information when the object is moving relative to the interrogation station.

There is a need for an identification system wherein moving objects such as railroad cars passing an interrogation station identify themselves for both accounting and control purposes. Such a system would also be applicable to boats, trucks, shipping containers, mailbags, pallets, etc.. As well as these commercial applications, there is also a need for an identification system for monitoring animals in their natural habitat, including both fish and birds. The system could be applicable for identification of humans for control and security purposes, the identification of livestock and many other uses. In addition to the above uses, the ability to read, write, delete or modify data in a digital form makes the system applicable to a variety of uses, an example of which is a credit card. In this case the system serves as a portable interrogatable memory for information such as a credit balance.

The complexity of modern transportation systems has increased to the point where automated traffic management has become essential for efficient operation. This is true of railways, highway truck transportation, urban transit systems, mining and logging operations, livestock management and even factory personnel, to name but a few.

Early attempts to meet these needs followed the premise that all that was necessary was to identify the individual vehicles automatically and all other management functions could then be carried out in a central computer. This notion belies the fact that a vast amount of data communications with a central data base are then required. In many cases, particularly where operations cover a large geographic area, this approach is both expensive and impractical. In addition, initial encoding of earlier devices was not satisfactory. The device was either factory programmed, requiring a cross reference table to relate its arbitrary number to that of the vehicle, or it was field programmed by physical and/or electrical contact, requiring a sealing operation in the field to ensure package integrity.

The present invention provides an electronic identification system that can store both fixed and changing information on a moving object, such as a railroad car, without physical contact and while the object is moving at relatively high speeds. Furthermore a portion of the information stored on the object can be protected from accidental erasure so that portion cannot be changed without further steps being taken.

In the case of a railroad car, the system provides the car's identity and other pertinent information relating to the car. Some of the information is protected from erasure, such as the identification number, the type of car and loading limits, and other information such as destination, contents, special handling considerations etc. can be reprogrammed remotely from an interrogation station.

To provide for high speed transmission of information, a memory that can be read and changed and has a number of separate pages to store information, is located on the object. Different interrogation stations can then be placed to send a coded interrogation signal to read individual pages of information. Some pages may be protected from erasure as they contain fixed information, while other pages may be remotely changed as desired. By utilizing separate pages in the memory, and more than one interrogation station, more information can be gathered in a shorter space of time, thus allowing higher relative speeds between the object and the interrogation station. The information gathered by the interrogation stations may be transmitted in a computer compatible format for storage or transmission by existing data communication systems.

Another use for the system is to place electronic identification devices along a path such as a railroad track and install an interrogation station on a moving vehicle such as a train. This provides accurate position information for the vehicle.

The electronic identification system of the present invention has an information and identity storage device including a logic circuit and memory, trigger circuit and a transmtter located on the object with the trigger circuit operating on low power. Upon being triggered by a signal from a remote interrogation station, the transmitter transmits the data in the memory in a short series of transmissions. Power for the transmitter is provided by a battery but can include other sources of power such as an inertial generator, electromagnetic radiation, induction, visible or infrared light, or by combinations of these power sources. Moving objects can generate power for the transmitter from movement or vibration in a gravitational field. This technique can also be used to extend the life of the battery.

The interrogation station, as well as sending a signal to trigger the trigger circuit, also has a pulse sequence generator to program the memory and a receiver to receive the data from the memory on the object. The use of an absolute time source in the information and identity storage device provides for synchronization between the transmitter and the receiver and allows the use of a non-return to zero code format. Alternatively, a free running clock can be used in the system and synchronization can be effected by choice of a suitable code format and appropriate processing in the decoding unit.

This system has the additional advantage of allowing the clock oscillator to be gated off between interrogations with further savings in quiescent power consumption. The data transfer rate for the transmitter should be sufficient to allow for the movement velocity between the object to be identified and the interrogation station.

In one embodiment the memory bank associated with the information and identity storage device on the vehicle can store 256 bits divided into four 64 bit pages. The first page could contain the most important information including the identity of the vehicle and can be read at speeds up to 320 km/hr. The other pages can be read by the same interrogation station at lower speeds or by a different station. 34 bits on the first page of the memory can be "write-protected" to prevent erasure. When the information and identity storage device is physically removed from a vehicle, the "write protected" portion of the memory bank can be reprogrammed for use on a different vehicle without physical alterations. In one embodiment these "write protected" bits can be reprogrammed by illuminating a light activated switch located on the information and identity storage device.

In railcar use a microwave signal is transmitted and received between the transmitter and the receiver. Other radio frequency, optical or inductive schemes are feasible. In the case of railroad cars, an interrogation station reads at a distance of up to 5 meters, but this distance can be increased to several kilometers for different uses, or reduced for other uses. The information and identity storage devices have to be suitably packaged for protection against weather and other environmental conditions and have antennas to allow transmission and receipt of coded signals in suitable locations.

The present invention provides an electronic identification system for remotely storing information on an object, and remotely retrieving information from the object including in combination an information and identity storage device located on the object, and at least one interrogation station located remotely from the object, the station adapted to read and program the information and identity storage device without physical contact, the information and identity storage device comprising, memory means to store information and identity, protect means adapted to protect a portion of the memory means against accidental erasure, logic circuit means to produce a predetermined coded signal representing the information and identity stored in the memory means, the logic circuit means having a remote non-contact means to program the portion of the memory means not protected by the protect means, transmitter means to transmit the coded signal, trigger circuit means which when triggered causes the coded signal to be transmitted, and battery power source for the information and identity storage device; the interrogation station comprising interrogation signal means adapted to trigger the circuit means in the information and identity storage device, pulse sequence generating means to program the portion of the memory means in the information and identity storage device not protected by the protect means, receiver means adapted to receive the coded signal from the information and identity storage device, synchronization means between the information and identity storage device and the receiver means, and decoder means to decode the coded signal, verify accuracy of the coded signal, and recorder the information and identity stored in the memory means of the information and identity storage device.

In other embodiments of the invention a first antenna is provided in the circuit means to pick up an interrogation signal, and a second antenna is adapted to transmit the coded signal from the transmitter means. An absolute time source is provided integral with the information and identity storage device, together with synchronization means between this time source and the receiver means. In another embodiment the memory means has the ability to store a plurality of pages representing the information and identity, and the logic circuit means can select from the plurality of pages upon receipt of predetermined timed interrogation pulses from the interrogation station. In yet a further embodiment, the decoder means verifies the accuracy of the coded signal by including an integral count of the number of zeros in the coded signal.

A light activated switch integral with the protect means is provided in one embodiment which when illuminated permits the portion of the memory means protected by the protect means to be erased and reprogrammed. In a still further embodiment, a wheel contact signal means is provided for use on a railroad car to indicate arrival of each car at the interrogation station.

Figure 6:
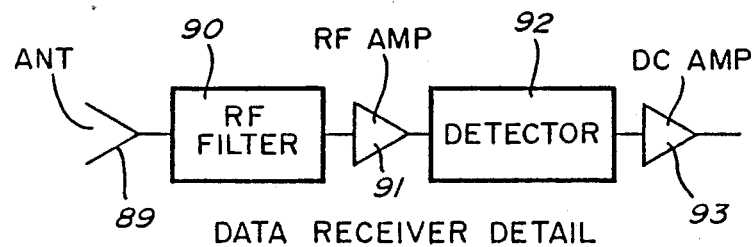

In drawings which illustrate embodiments of the invention,

FIG. 1 is a simple block diagram illustrating one embodiment of the information and identity storage device and the interrogation station of the present invention, FIG. 2 is a schematic diagram illustrating one embodiment of an additional power source derived from vibrational movement, FIG. 3 is a block diagram of a logic circuit in the information and identity storage device, FIG. 4 is a schematic diagram of a microwave trigger circuit, FIG. 5 is a block diagram of the interrogation station, FIG. 6 is a block diagram showing the coded signal receiver in the interrogation station.

Referring now to FIG. 1, the components of the electronic identification system include an identification and identity storage device 10 and an interrogation station 11. The information and identity storage device 10 includes a power source 12, a logic circuit and memory 13, a trigger circuit 14 with a first antenna 15 and a radio frequency transmitter 16 and a second antenna 17. The interrogation station 11 includes a receiver 18 with an antenna 19, a decoder 20, a data processor 21, and a trigger interrogation and pulse sequence generator 22 with an antenna 23. The data processor 21 aids in the decoding process, formats the data for communication with a central data processing unit (not shown) and generally controls the various functions of the interrogation station 11. In general the complexity of the data processor 21 depends on the particular function which the whole identification system is required to perform.

The power from the power source 12 for data retention in the memory of the information and identity storage device 10 must be present at all times (unless an EEPROM is used) and so a battery is required. However, the battery could be supplemented by other power sources including energy transfer from inductive or radio-frequency energy fields, of which several examples exist in prior art, or inertial field generation as described herein. In many embodiments, of which railroad cars are one example, the power requirements are such that available batteries could provide up to 20 year lifetimes without supplemental sources of energy.

For those applications where additional energy is required, and where the object requiring data storage is in motion, a means for producing power for data transmission is from the inertial field.

FIG. 2 illustrates an inertial energy generator where power is derived from the vibration or vertical movement of the moving object. A small mass 30 is shown mounted in a frame 31 on one end of a resilient strip 32. Piezoelectric material 33 is bonded to each side of the strip 32, and a movement of the mass 30 causing deflection of the strip 32 generates an alternating voltage. Leads 34 from the piezoelectric material 33 feed to a circuit where rectification and doubling of the voltage is performed by the diodes 35, 36 and the energy storage capacitors 37, 38. Alternatively, an ordinary full wave or half wave rectifier may be used if the higher voltage is not required. The direct current energy can either be stored in the capacitors 37, 38 or in a rechargeable battery 39. A means of limiting the maximum voltages is provided in the form of a zener diode 40 or by a number of diodes in series, or by a voltage regulator circuit.

The contents of the memory is maintained by a battery power source 12 which provides sufficient energy to the transmitter 16 so that the coded signal is completely transmitted before the stored power drops low enough to stop the data transmission. The transmitter 16 draws little power from the power source 12, in its quiescent state, allowing excess generated energy to be stored for later transmission.

The data to be transmitted from the information and identity storage device 10 must be formated in such a way that the desired information is conveyed accurately. While the following scheme is the preferred embodiment for marking railroad cars, a number of variations are possible. In general, the data will contain coded information to designate the owner of the car and the car serial number in a protected portion of the memory.

Data bits can be coded in various ways. For North American railroad applications, where cars associated with various owners are intermixed, a code is allocated to the protected portion of the memory frame as follows:

9 bits: represent car owner
20 bits: represent car serial number
5 bits: are used as a check (zero count)

The data code stream contains either a means of self synchronization relying on the code format, or an external or inherent method of synchronization is provided. In one embodiment synchronization in some form is provided at the interrogation station to clock the identification device. An alternative solution is to provide an absolute time source such as a clock with the identification device, the clock being stable enough so that synchronization of a second independent clock in the interrogation station is maintained within a single bit for the period of time required to transmit the coded signal. The availability of low cost accurate timing crystals for wristwatch manufacture make the use of a non-return to zero (NRZ) code feasible since the timing is predictable enough for data recovery. The low power consumption of these devices allows lifetimes of up to 20 years on available batteries.

One element of the information and identity storage device is the code rate employed. High code rates allow for many reads at high speeds but are more difficult to decode and consume more power. Typical microwave antennas allow a reading window of about 300 mm. A transmitter spends about 3.5 milliseconds in this window at 320 km/h. Assuming at least 3 transmissions to be received, the total time for a transmission would be about 1 millisecond. A transmission comprises: 8 preamble bits and 64 data bits so that a sufficient code rate is about 65 khz. Doubling the frequency of a watch crystal provides a convenient rate of 65.5 khz with acceptably low power. At more common railroad and highway speeds such as 100 km/h, the transmitter can be read approximately ten times, with consequent improvement in accuracy. In order to read all four pages of data with three reads each, the maximum speed is 80 km/h which is more than adequate for those locations at which this information is required. With this code rate, the spacing of information and identity storage devices on adjacent railway cars can be of the order of a meter without any difficulty.

A block diagram of the logic circuit 13 is shown in FIG. 3. The logic circuit would be familiar to those skilled in the art. To achieve the very low current consumption required, the entire information and identity storage device is realized in a single CMOS integrated circuit or circuits. Its operation is as follows:

In response to a trigger impulse, the trigger circuit 14 resets the flip flop 52 and the counters 53 and 54 and auxiliary counter 55 are allowed to count. Counter 54 sequentially selects memory addresses which cause the contents of the preamble store 56 and the first memory page 57 to be the output to the transmitter 16 which consequently sends out the coded signal. At various precisely timed points during the transmission, the program mode and page select circuit 59 allows memory paging or program mode entry Access to the first 34 bits is controlled by the light activated switch 60. Data entry is also through the trigger circuit 14. The device is returned to its quiescent state either when counter 54 reaches the end of its count, signifying that all bits have been sent, or when auxiliary counter 55 ends its count.

The trigger circuit 14 may take one of several forms depending on a specific application. The characteristics of the trigger circuit are as follows:
1. High input impedance.
2. A threshold level of voltage is exceeded in order to initiate the transmission.
3. Trigger initiation is effected by an impulse rather than a steady state condition.
4. . The trigger circuit is passive in the sense that its operational power is obtained from the triggering signal and consumes no energy in the quiescent state.

Energy may be provided to the trigger circuit 14 in various forms such as electromagnetic, magnetic, infrared, ultrasonic or pressure In one embodiment used in the railroad environment, a burst of microwave energy is used as an interrogation signal. FIG. 4 shows a trigger circuit suitable for receiving an interrogation signal 70 in the form of electromagnetic radiation, demodulating the burst with diodes 71 and capacitors 72 and matching the appropriate input impedance with a pulse transformer 73.

In order to access the additional pages of memory, a timed sequence of interrogation pulses is sent. A different sequence of pulses allows the memory to be written to, this access only being permitted to the "rite protected" portion of memory unless the protect switch is illuminated. The individual bits of the memory are also programmed using appropriately timed interrogation pulses.

Included in the information and identity storage device 10 are two antennas 15 and 17. These could take various forms but in one embodiment, they operate at microwave frequencies. Both antennas and also all other circuitry in the device arc mounted on a sheet of low loss material. The antennas consist of patches or arrays of patches of conductive material whose design would be familiar to one skilled in the art. The configuration of the patches is dependent on the frequency of operation and the desired antenna patterns. One antenna is associated with the trigger circuit 14 described above, and the other is connected to the transmitter 16 which is a single stage device arranged to produce energy at the desired frequency. An output of 1 to 10 milliwatts is more than sufficient for reliable operation of the system. In general, the operating frequency of the data link and the triggering link are different, but since they do not co-exist in time, they may be the same.

FIG. 5 illustrates a more detailed arrangement of the interrogation station 11. The embodiment shown represents one configuration suitable for railroad applications.

Alternative interrogation stations and receiving antennas may be employed.

Three microwave interrogator signal sources with antennas 80, 81, 82 are shown, one on each side and between the two ties of a railroad track to allow reading of information and identity storage devices on either side or under the cars. A coded signal receiver 83 with antennas 84, 85, 86 on either side and between the track is located beside the track along with the rest of the interrogation equipment 87, 88. The receiver is shown in more detail in FIG. 6 and has an antenna 89, RF filter 90, RF amplifier 91, detector 92 and DC amplifier 93. Operating frequency is chosen to minimize noise and unwanted signals and is typically in the 2500 Mhz region.

Detected and amplified signals from the receiver are fed to the decoder 87 and microprocessor system 88 where they are checked for accuracy and then stored or transmitted to a host computer as required Synchronization with the transmitter takes place in the decoder circuit which has an absolute time reference on the same frequency as the transmitter.

In one embodiment of the system, wheel contacts provide supplementary information such as speed and direction of the train. Wheel contacts indicate when the whole train has passed, and at this time the data is assembled in a format compatible with the central data processor to which it is sent either in response to an interrogation or on its own request. It is also possible to use reflected signals from the interrogating beam to determine the speed and direction using the doppler effect.

Although the embodiment described herein has been specifically described as being suitable for railroad use, it will be apparent to those skilled in the art, that the system has many applications and various changes may be made to the circuits and elements described herein without departing from the scope of the present invention which is limited only by the following claims.

The embodiments of the invention in which an exclusive property or privilege is claimed are defined as follows:

1. A low power electronic identification system for remotely programming and storing information on an object and remotely retrieving information from the object, including, in combination, an information and identity storage device located on the object, and at least one interrogation station, one of said object and station moving and the other of said object and station being fixed, said station being located relatively remotely from the object, for reading and programming the information and identity storage device without physical contact when said one moves adjacent said other;

the information and identity storage device comprising:
memory means for storing information and identity data for later retrieval,
protect means for protecting a portion of the memory means against accidental erasure,
logic circuit means for producing a predetermined coded signal representing the information and identity data stored in the memory means, the logic circuit means including means responsive to a control signal comprising a series of pulses from said interrogation station for programming the portion of the memory means not protected by the protect means based on the series of pulses comprising the control signal from the interrogation station,
transmitter means for transmitting the coded signal,
trigger circuit means which is triggered in response to receiving a burst of energy of a predetermined wavelength for, when triggered, causing the coded signal to be transmitted by the transmitter means and,
a long life battery power source for the information and identity storage device,
the system comprising:
means located adjacent said other for indicating the arrival of said one adjacent said other;
the interrogation station comprising:
interrogation signal means for triggering the trigger circuit means in the information and identity storage device, by providing a said burst of energy,
pulse sequence generating means for generating a said control signal comprising a series of pulses for programming the portion of the memory means in the information and identity storage device not protected by the protect means,
receiver means for receiving the coded signal from the information and identity storage device,
synchronization means between the information and identity storage device and the receiver means for synchronizing the signals transmitted therebetween and,
decoder means for decoding the coded signal for verifying the accuracy of the coded signal, and for recovering the information and identity data stored in the memory means of the information and identity storage device.

* * * * *

UNITED STATES PATENT AND TRADEMARK OFFICE
CERTIFICATE OF CORRECTION

PATENT NO. : 4,937,581

DATED : June 26, 1990

INVENTOR(S) : Howard A. Baldwin et al.

It is certified that error appears in the above-identified patent and that said Letters Patent is hereby corrected as shown below:

Column 1, line 6, after "C.F.R" insert a period.

Column 2, line 33, change "transmtter" to --transmitter--.

Column 3, line 53, chnage "recorder" to --recover--.

Column 6, line 13, change "flip flop" to --flip-flop--.

Column 6, line 41, after "pressure" insert a period.

Column 7, line 29, after "required" insert a period.

Signed and Sealed this

Seventeenth Day of September, 1991

Attest:

HARRY F. MANBECK, JR.

*Attesting Officer*  *Commissioner of Patents and Trademarks*